Aug. 18, 1953 T. HINDMARCH 2,648,990
POWER TRANSMISSION MECHANISM
Filed March 30, 1951 2 Sheets-Sheet 1
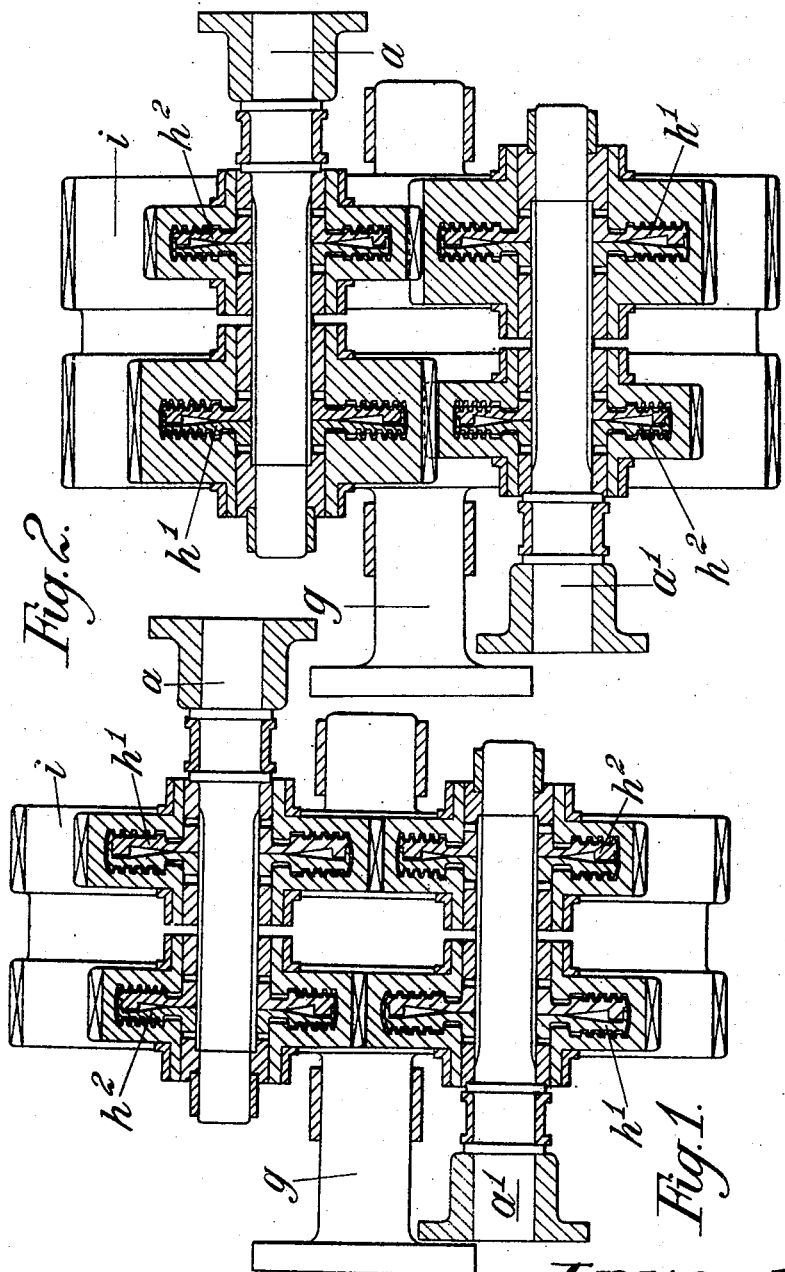
Inventor
T. Hindmarch Aug. 18, 1953 T. HINDMARCH 2,648,990
POWER TRANSMISSION MECHANISM
Filed March 30, 1951 2 Sheets-Sheet 2
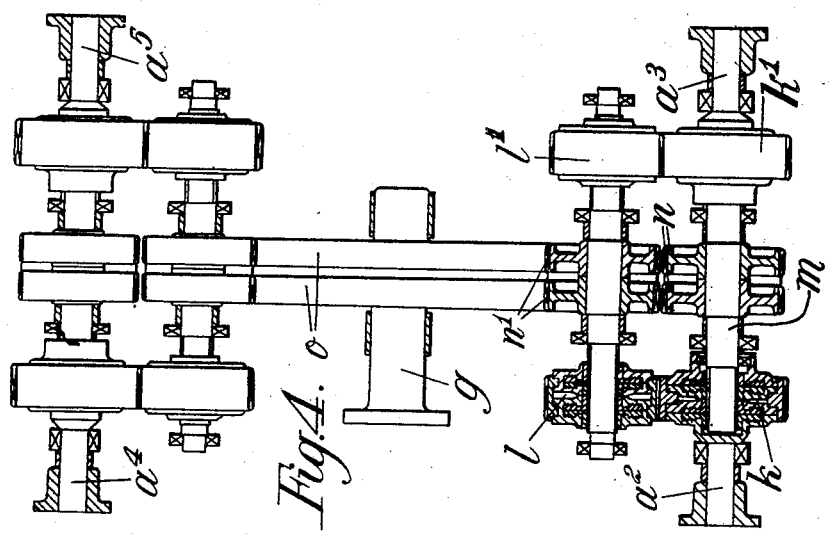
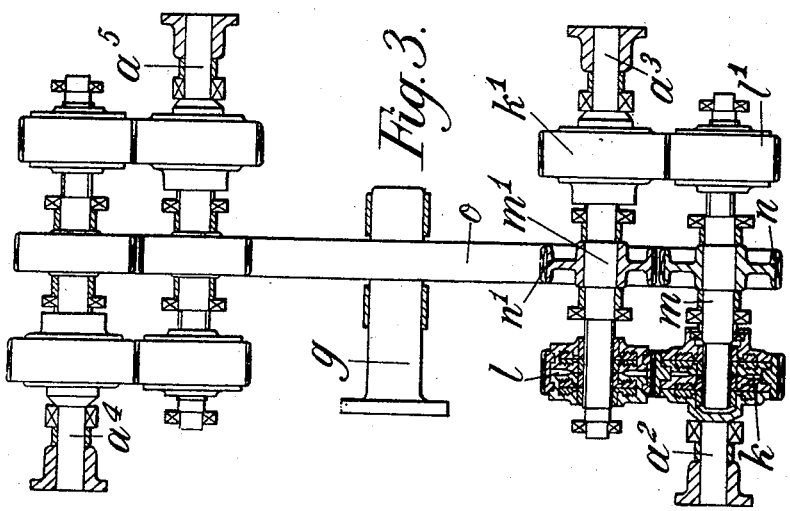
Inventor
T. Hindmarch
By Glascock Downing Seebold
Attys.

Patented Aug. 18, 1953

2,648,990

UNITED STATES PATENT OFFICE 2,648,990

POWER TRANSMISSION MECHANISM

Thomas Hindmarch, Chesham, England

Application March 30, 1951, Serial No. 218,396
In Great Britain June 18, 1947

3 Claims. (Cl. 74—361)

This invention relates to power transmission mechanisms in which it is required to transmit power from two or more input shafts to one or more output shafts with ahead and astern or reverse directions of running and also a neutral position.

Such transmissions usually embody one or more idler wheels for the reverse running but the object of the present invention is to provide a power transmission of the kind in question without the necessity for providing any idler wheels so that the transmission will be particularly suitable for use in cases where light weight and space restrictions are important factors to be considered.

The invention consists in a power transmission mechanism comprising two or more units each having a first shaft, a second shaft mounted for rotation parallel thereto, a clutch mounted on said first shaft and having an inner member which is drivingly connected to the said first shaft, a clutch mounted on said second shaft and having an inner member which is drivingly connected to said second shaft, the clutch on the first shaft having an outer member drivingly engaging an outer member of the clutch on the second shaft by means of teeth on each said member, means for driving one of the members of the clutch on the said first shaft, an output shaft having a gear wheel thereon which is driven alternatively in opposite directions by the engagement and disengagement of the appropriate clutches, the pair of shafts of at least one unit being common with the pair of shafts of at least one other unit, and means to engage and disengage the clutches collectively as required.

The neutral position in the transmission will be given when both clutches are disengaged.

Further features of the invention will be apparent from the description given hereafter.

The accompanying drawings illustrate several modes of carrying out the invention.

Figure 1 is a view of a form of drive for two prime movers.

Figure 2 shows a slight modification of Figure 1.

Figure 3 is a view, partly in section, of a drive for four prime movers, and

Figure 4 is a similar view to Figure 3 showing a slight variation.

Figure 1 shows a form of drive adapted for two prime movers of which the respective input shafts are shown at $a$ and $a'$. Each input shaft carries two pressure fluid operated clutches $h'$, $h^2$, the outer driven members of the clutches $h'$ meshing with the gear wheel $i$ on the output shaft $g$, while the outer driven members of the clutches $h^2$ are not in mesh with the said gear wheel but mesh with the outer driven members of the clutches $h'$. The arrangement is such that the output shaft $g$ will be driven in one direction of rotation when the clutches $h'$ are engaged, and in the reverse direction when the clutches $h^2$ are engaged thus driving any mechanism connected to the output shaft $g$ in either direction required.

Figure 2 shows a very similar form of drive to that shown in Figure 1, but while in Figure 1 it is essential that the prime movers run basically in opposite directions of rotation, so that when they are arranged face to face as shown the shafts $a$, $a'$ rotate in the same direction, the arrangement shown in Figure 2 permits the use of identical prime movers. For the ahead rotation of output shaft $g$ (Figure 2) clutch $h'$ on shaft $a$ and clutch $h^2$ on shaft $a'$ are engaged whereas for the astern rotation clutch $h^2$ on shaft $a$ and clutch $h'$ on shaft $a'$ are engaged.

Figure 3 shows a form of drive adapted for four prime movers all driving on to a common output shaft $g$, the input shafts of the prime movers being indicated at $a^2$, $a^3$, $a^4$, and $a^5$. Referring to the lower part of the figure the input shaft $a^2$ carries a pressure fluid operated clutch $k$ the outer driving member of which meshes with the outer driving member of a similar clutch $l$. The inner members of the clutch $k$ are carried on a shaft $m$ having a gear $n$ engaging a gear wheel $o$ on the output shaft $g$. Similarly the inner members of the clutch $l$ are carried on a shaft $m'$ having a gear wheel $n'$ which also meshes with the gear wheel $o$ on the output shaft. By engaging the clutch $k$ the output shaft is driven in one direction by the gear wheel $n$ while the reverse direction of drive is obtained from the gear wheel $n'$ by engaging the clutch $l$. Further clutches $k'$, $l'$ operate similarly in respect of the input shaft $a^3$, the inner members of these clutches $k'$, $l'$ being carried by the shafts $m'$, $m$ respectively.

In Figure 3 the input shafts of each pair of prime movers are eccentric to one another but all the input shafts run in the same direction of rotation. This arrangement therefore necessitates that the prime movers run basically in opposite directions of rotation. In Figure 4, which shows a modified arrangement of my invention, each pair of input shafts are concentric, and each two prime movers also run basically in opposite directions.

The operation of the transmission of Figure 4 will be clear when the drawing is considered. Referring to the lower part of the figure the input shaft $a^2$ carries a pressure fluid operated clutch $k$ the outer driving member of which meshes with the outer driving member of a similar clutch $l$. The inner members of the clutch $k$ are carried on a shaft $m$ having a gear $n$ engaging a gear wheel $o$ on the output shaft $g$. Similarly the inner members of the clutch $l$ are carried on a shaft $m'$ having a gear wheel $n'$ which also meshes with the gear wheel $o$ on the output shaft. By engaging the clutch $k$ the output shaft is driven in one direction by the gear wheel $n$ while the reverse direction of drive is obtained from the gear wheel $n'$ by engaging the clutch $l$. Further clutches $k'$, $l'$ operate similarly in respect of the input shaft $a^3$, the inner members of these clutches $k'$, $l'$ being carried by the shaft $m$, $m'$ respectively.

It will be understood that the principles embodied in this invention may be applied to any number of prime movers driving any number of output shafts, and the invention therefore is not to be limited to the foregoing details of construction which are given purely by way of example to describe the nature of the invention and not to limit its scope. For if we assume that Figure 1 and Figure 2 show a plan view of such a transmission with part of the top housing removed, then it is quite possible to fit in this top housing a further output shaft $g$ with a gear wheel $i$ which in turn meshes with wheels $h'$. In such a case the transmission will have two output shafts.

Alternatively, for certain applications it may be desirous to have more than two output shafts arranged in such a way that two shafts mesh with both gear wheels $h'$ whereas additional output shafts may only mesh with either of the gear wheels $h'$ but not with both. In a similar way the number of input shafts can be varied by arranging their respective position relative to wheel $i$ accordingly.

Moreover while I have referred herein to pressure fluid-operated clutches as being the most convenient in practice, clutches of other form may be adopted if desired.

In any modification of the invention it is important to provide control mechanism for the clutches such that the correct clutches are operated simultaneously.

What is claimed is:

1. A power transmission mechanism comprising at least one pair of units, each unit having a first shaft, a second shaft mounted for rotation parallel thereto, a friction clutch mounted on said first shaft and having an inner friction member drivingly connected to said first shaft, a friction clutch mounted on said second shaft and having an inner friction member drivingly connected to said second shaft, the clutch on the first shaft having an outer friction member drivingly engaging an outer friction member on the clutch on the second shaft by means of teeth on each said friction member, the pair of shafts of one unit in a pair of units being in extension of the pair of shafts of the other unit in the same pair of units, each unit being driven by way of one of the members of the clutch on the said first shaft, and an output shaft having a gear wheel thereon which is driven alternatively from each shaft in each unit in opposite directions by the engagement and disengagement of the appropriate clutches.

2. A power transmission mechanism as claimed in claim 1, in which there are at least two pairs of units, and the said output shaft and the gear wheel on said output shaft being common to all pairs of units.

3. A power transmission mechanism as claimed in claim 1, in which at least one of the clutches in each unit is of the pressure fluid operated type.

THOMAS HINDMARCH.

References Cited in the file of this patent

UNITED STATES PATENTS

| Number | Name | Date |
|---|---|---|
| 1,151,762 | Day | Aug. 31, 1915 |
| 1,248,735 | Sitney | Dec. 4, 1917 |
| 1,364,325 | Sitney | Jan. 4, 1921 |
| 1,662,301 | Coykendall | Mar. 13, 1928 |
| 1,667,842 | Coykendall | May 1, 1928 |
| 1,722,302 | Lamb | July 30, 1929 |
| 2,311,597 | Schmitter | Feb. 16, 1943 |